Nov. 14, 1961 L. A. KINGSLEY 3,008,866
TAPE MARKING MACHINE
Filed April 15, 1957 7 Sheets-Sheet 1
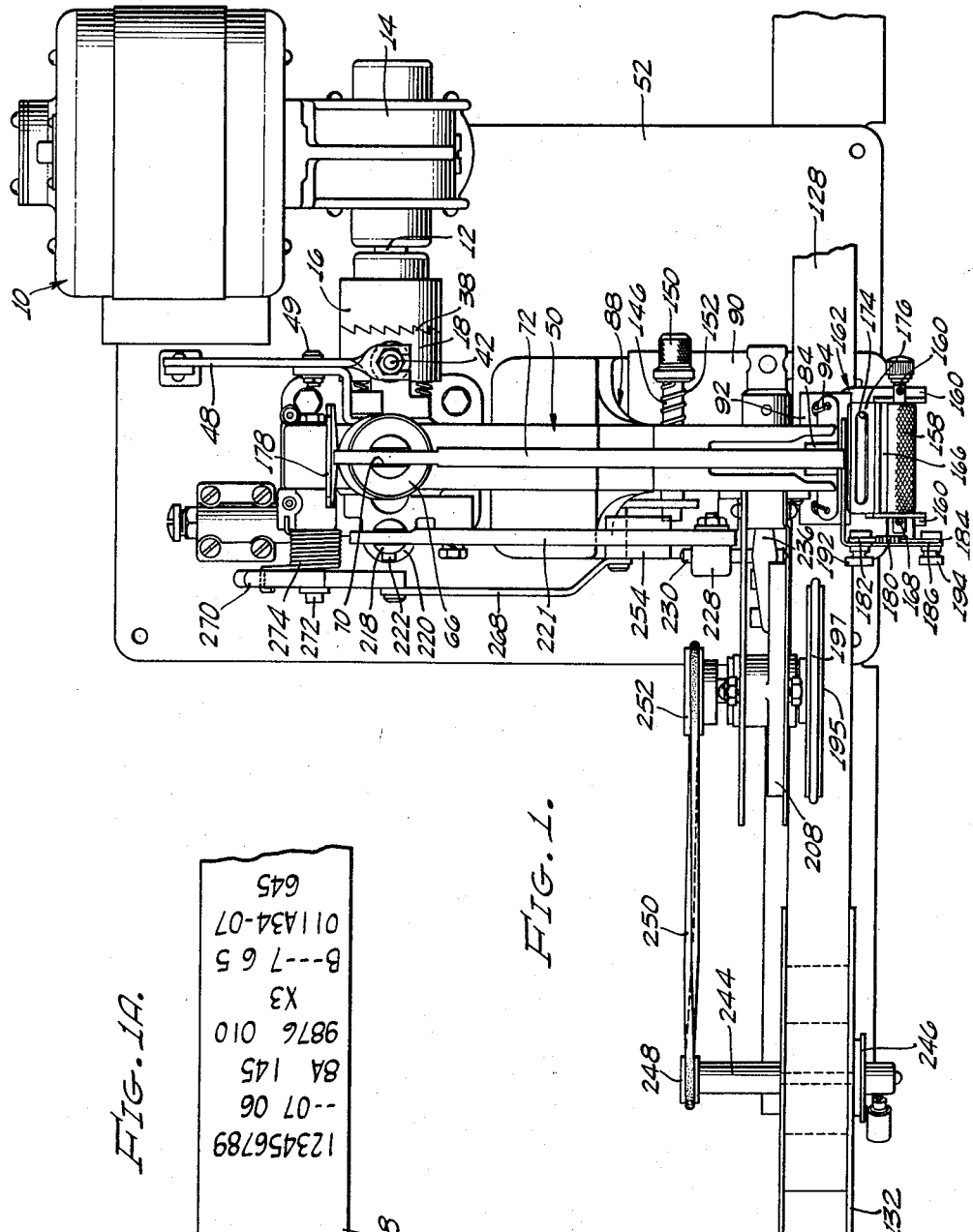
INVENTOR.
LEWIS A. KINGSLEY
BY
Lyon+Lyon
ATTORNEYS

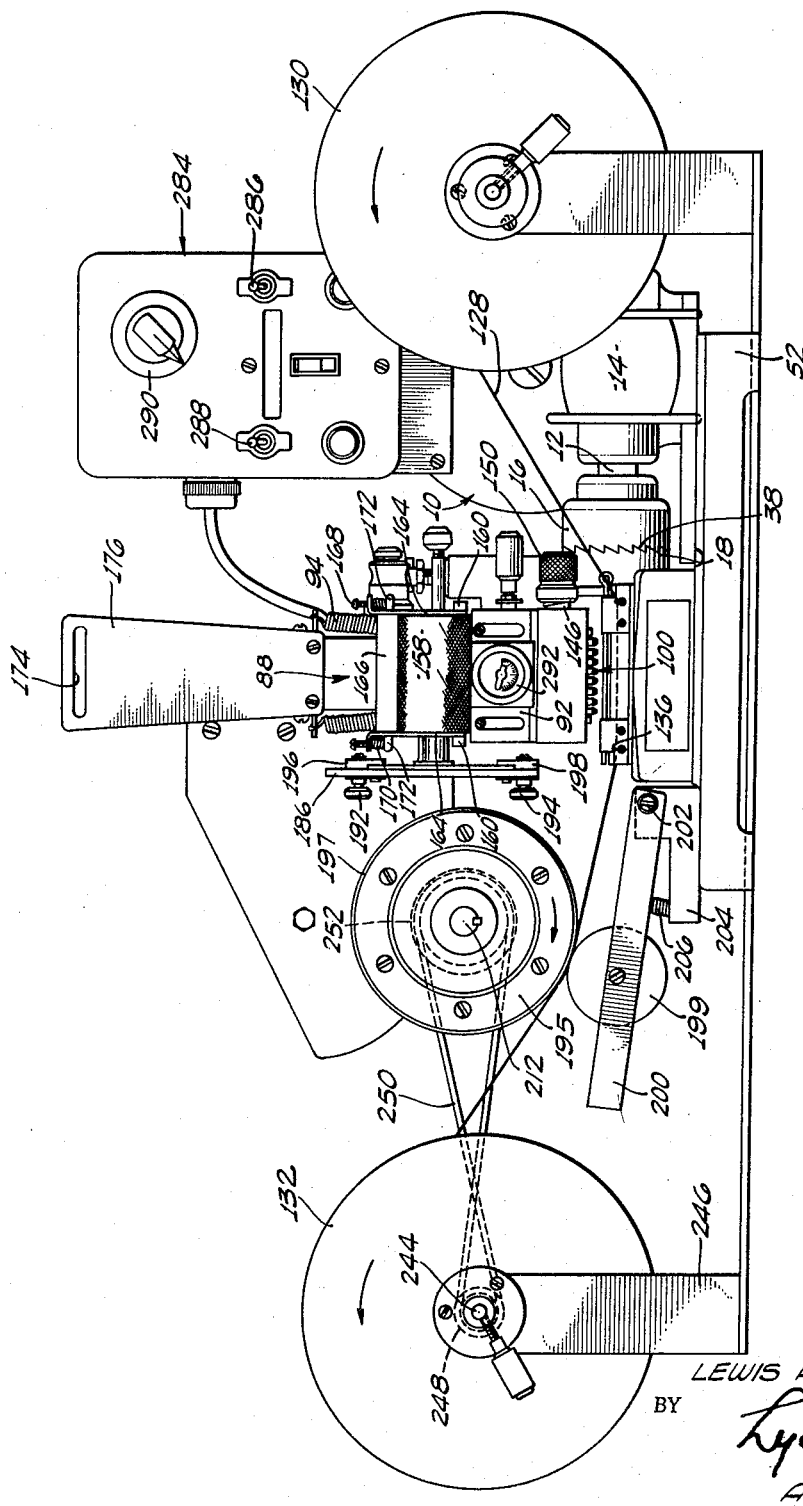

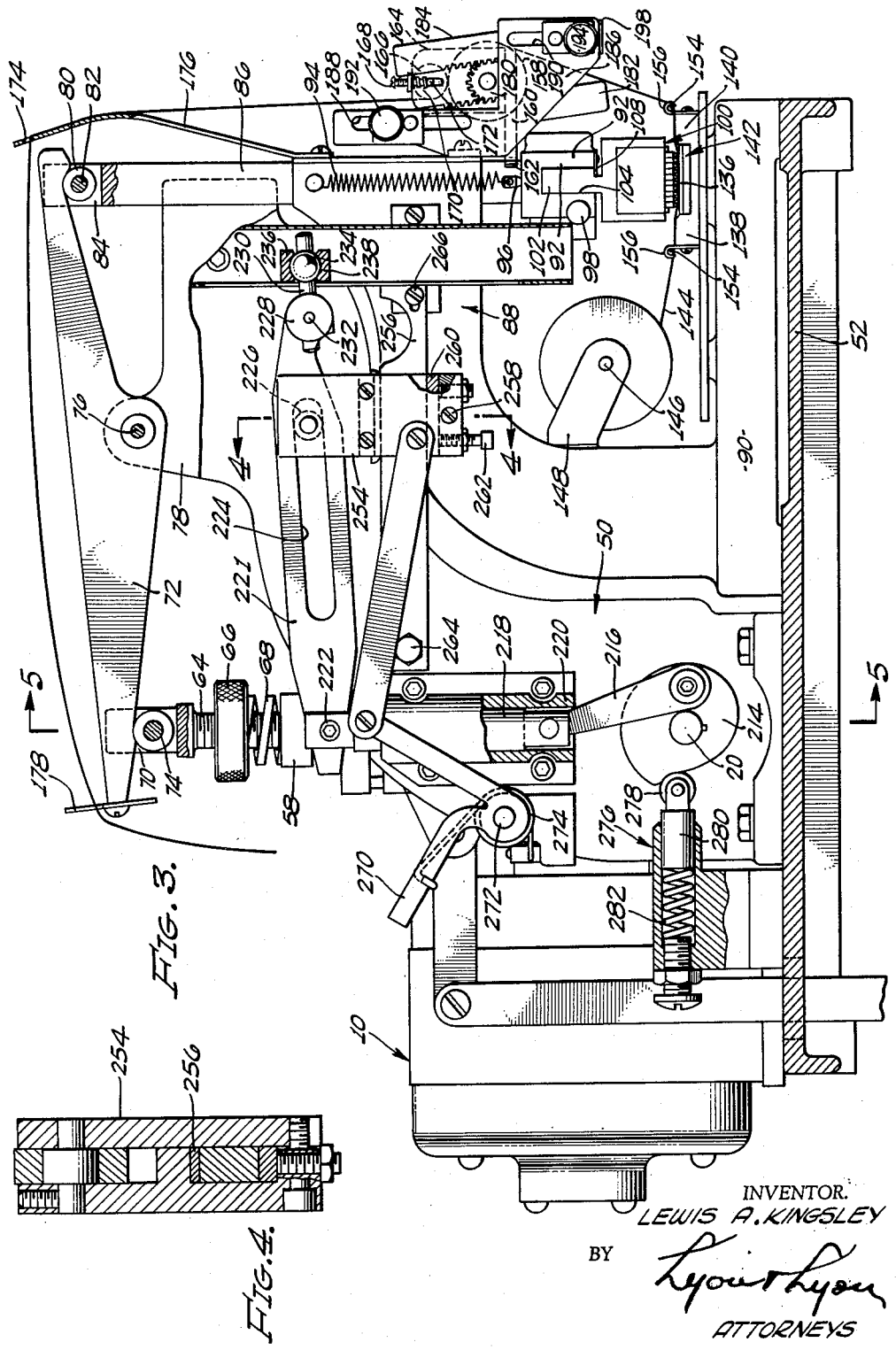

Nov. 14, 1961 L. A. KINGSLEY 3,008,866
TAPE MARKING MACHINE
Filed April 15, 1957 7 Sheets-Sheet 4
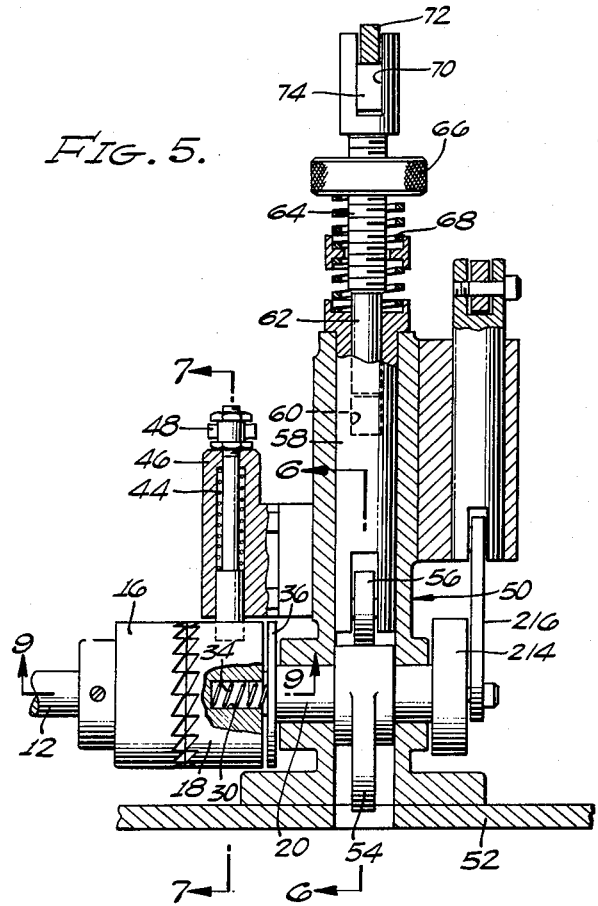
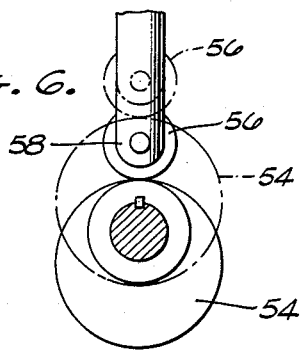
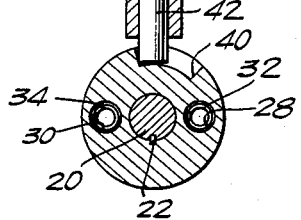
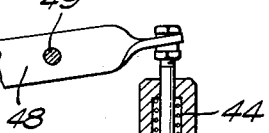
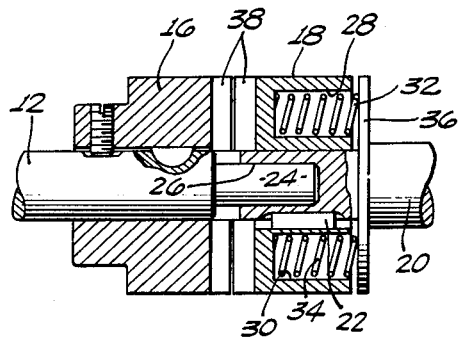
INVENTOR.
LEWIS A. KINGSLEY
BY
ATTORNEYS

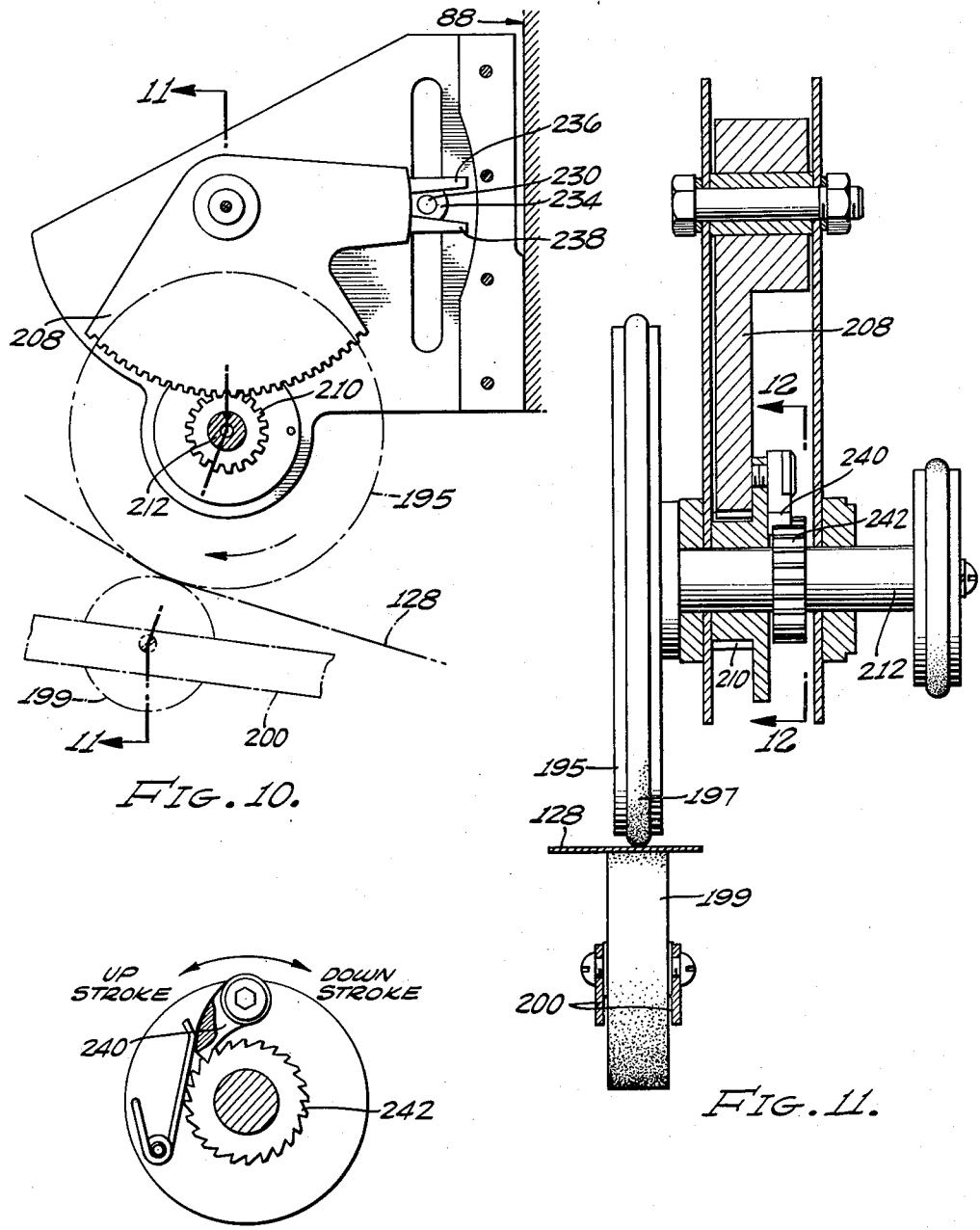

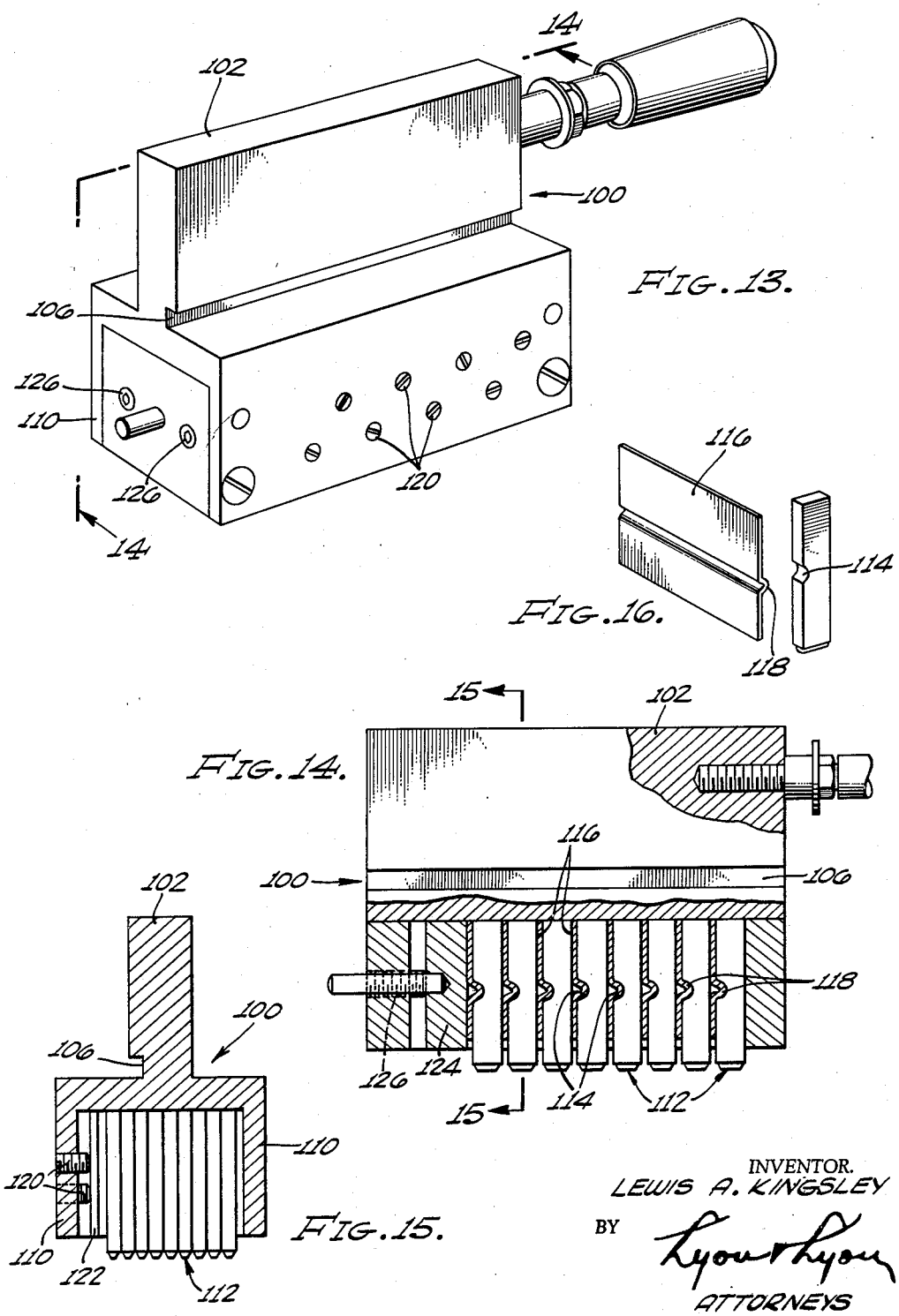

Nov. 14, 1961 L. A. KINGSLEY 3,008,866
TAPE MARKING MACHINE
Filed April 15, 1957 7 Sheets-Sheet 7
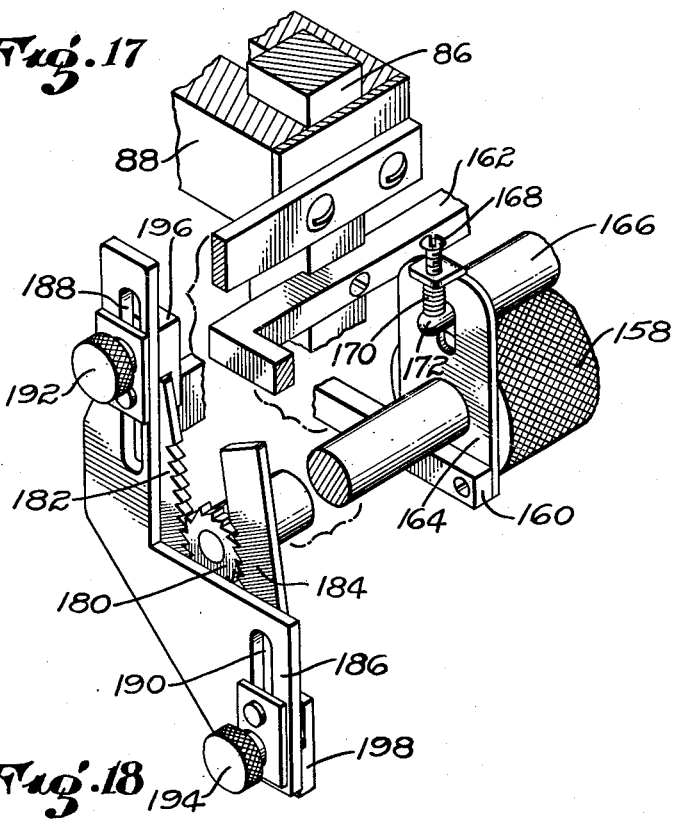
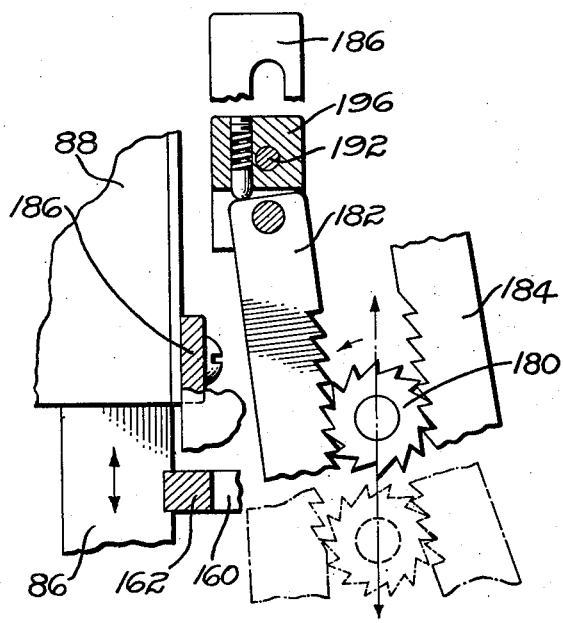
INVENTOR.
LEWIS A. KINGSLEY
BY Lyon+Lyon
ATTORNEYS

United States Patent Office 3,008,866
Patented Nov. 14, 1961

3,008,866
TAPE MARKING MACHINE
Lewis A. Kingsley, Beverly Hills, Calif. (% Kingsley Stamping Machine Company, 850 Cahuenga Blvd., Hollywood, Calif.)
Filed Apr. 15, 1957, Ser. No. 652,985
6 Claims. (Cl. 156—540)

This invention relates to an improved hot stamping machine.

It is a further object of this invention to provide a hot stamping machine particularly adapted to mark tape, particularly vinyl covered tapes of the type sold under the trade name "Scotchcol."

It is a further object of this invention to provide novel means for advancing tape to be marked through the machine.

It is still a further object of this invention to provide novel means for advancing foil through the machine.

It is still a further object of this invention to provide novel type holding means for marking upon such tape.

It is a further object of this invention to provide novel means for controlling and timing the stamping and feeding operations.

Other objects and advantages will be readily apparent from the following description.

In the drawings:
FIGURE 1 is a top plan view of the machine.
FIGURE 1-A is a view of the tape as marked.
FIGURE 2 is a frontal elevation of the machine.
FIGURE 3 is a side elevation with parts thereof broken away.
FIGURE 4 is a view taken along line 4—4 of FIGURE 3.
FIGURE 5 is a view taken along line 5—5 of FIGURE 3.
FIGURE 6 is a view taken along line 6—6 of FIGURE 5.
FIGURE 7 is a view taken along line 7—7 of FIGURE 5.
FIGURE 8 is a view similar to FIGURE 7 with the clutch disengaged.
FIGURE 9 is a view taken along line 9—9 of FIGURE 5.
FIGURE 10 is a side elevation of the tape take up drive.
FIGURE 11 is a view taken along line 11—11 of FIGURE 10.
FIGURE 12 is a view taken along line 12—12 of FIGURE 11.
FIGURE 13 is a perspective of the type holder.
FIGURE 14 is a view taken along line 14—14 of FIGURE 13.
FIGURE 15 is a view taken along line 15—15 of FIGURE 14.
FIGURE 16 is a perspective view of the type holding mechanism.
FIGURE 17 is a perspective view of the rack and pinion mechanism.
FIGURE 18 is a fragmentary side elevation of the rack and pinion operation.

In the embodiment illustrated, a motor 10 drives shaft 12 through gear box 14. Mounted upon shaft 12 is one-half 16 of a clutch. The other half 18 of the clutch is mounted upon a shaft 20 and is keyed thereto as at 22. The shaft 12 has a cylindrical extension 24 which projects into a bore 26 on shaft 20. Clutch half 18 floats freely on shaft 20 and has a pair of spring receiving recesses 28 and 30 receiving springs 32 and 34 which contact plate 36 on shaft 20 and urge clutch half 18 towards clutch half 16 whereby the teeth 38 mesh so that rotation of shaft 12 is transmitted to shaft 20. To disengage the clutch the half 18 has a slot 40 which receives plunger 42 which is urged downwardly by spring 44 mounted in housing 46. A lever 48 pivotally mounted on pin 49 is secured to the upper extremity of plunger 42. Thus when the lever is pivoted counter clockwise in FIGURE 7, plunger 42 is lifted out of slot 40 permitting rotation of the clutch member 18 and shaft 20. When lever 48 is released spring 44 urges same downwardly into slot 40 preventing rotation of clutch member 18 which is held against the urging of springs 32 and 34 out of engagement with clutch member 16 until plunger 42 is again raised. Lever 48 may be controlled manually, by a treadle or any other well known means.

The shaft 20 is the drive shaft for the stamping machine and projects through the rear portion of the goose necked body 50, which is mounted upon base plate 52 which also supports motor 10 and gear box 14. The shaft 20 has mounted thereon within body 50 a cam 54 (FIG. 5). Cam follower 56 is mounted upon shaft 58 which in turn is mounted for vertical reciprocation in body 50. Thus rotation of shaft 20 is translated into vertical reciprocation of shaft 58. Shaft 58 at its upper extremity has a bore 60 which slidingly receives stud 62 of threaded shaft 64. A nut 66 is threaded to be vertically adjustable on shaft 64 and acts as a base for spring 68 which bears against the upper extremity of reciprocating shaft 58 which is recessed to receive spring 68. The upper extremity of shaft 64 is forked as at 70 to receive rocker arm 72 which bears against roller 74 which is held by a suitable pin in the fork 70 providing a pivotal connection between arm 72 and shaft 64.

The rocker arm 72 is provided with a fulcrum by pin 76 mounted in a suitable fork 78 at the peak of body 50. The forward extremity of the rocker arm bears against roller 80 held by pin 82 in the forked upper extremity 84 of the stamping machine ram bar 86.

Ram bar 86 is mounted in a suitable guide way at the extremity of the smaller goose neck housing 88 which in turn stands on base 90 which is anchored to base plate 52. The ram bar 86 is free to reciprocate in its guide way and carries at its lower extremity the type holder 92. As nut 66 is raised or lowered on shaft 64 the stroke of the type holder may be varied. Spring 94 has one extremity secured to the housing 88 and the other extremity secured to stud 96 on type holder 92 which urges the ram bar up. A heating element 98 is provided in the form of an electrical element embedded in the type holder to which electrical current is provided from any suitable source.

A type holder head 100, best seen in FIGURES 13 through 16, has its upper extremity 102 shaped to slide into slot 104 of type holder 92 and also has a groove 106 adapted to receive retaining plate 108 which is secured to the underside of type holder 92 to provide a snug fit and avoid relative movement between the type holder and type holder head 100. The mounting of the type holder head is described in detail in United States Letters Patent 2,663,252.

Depending from the head is a pair of parallel flanges 110 forming a type receiving channel. The individual type is arranged in rows 112. Each type has a groove 114 therein while spacers 116 are provided with ribs 118 which fit into grooves 114. Thus each row of type is spaced from one another while the individual pieces of type are restrained against falling out due to expansion or contraction upon being subjected to hot stamping temperatures. One of the flanges 110 has a plurality of set screws 120 therein, one for each row 112 of type, each of which bears against the type or a shim 122 holding the rows in place. Also a plate 124 extends transversely engaging the last row of type and is held by set screws 126. This means of holding the rows of type permits considerable variation in the accuracy of the individual pieces of type without changing the effectiveness of the longitudinal or transverse holding means.

The tape to be stamped is designated 128 and moves from supply roll 130 to take-up roll 132. The walls 138 and 140 are spaced from one another a sufficient distance to receive and guide tape 128 and type holder head 100. The tape passes beneath rods 134 and 136 which are supported between parallel side walls 138 and 140 of the printing bed, forming channel 142. The printing foil 144 is mounted upon a shaft 146 which shaft is rotatably mounted on bracket 148 attached to housing 88. A knob 150 is removable from shaft 146 and spring 152 holds the roll of foil in the desired position on shaft 146. The foil is reeved beneath a pair of pins 154 which are on opposite sides of the printing bed and project through suitable sleeves 156 supported above walls 138 and 140. There are two sleeves for each pin spaced from one another a greater distance than the thickness of the foil and the pins may be pulled out of the sleeves to facilitate reeving of the foil across the printing bed at right angles to the path of the tape.

Thus, as the type head is lowered, it engages the foil and lowers same into contact with the tape and hence onto the printing bed. The type being heated melts the material on the foil and deposits same on the tape, thereby stamping on the tape the desired numbers or letters. The advancing of the foil 144 through the machine is accomplished by the following mechanism. A knurled roller 158 is rotatably mounted between the spaced arms 160 of the U-shaped bracket 162 mounted upon ram bar 86, and hence reciprocating therewith. A pair of plates 164 project above roller 158 forming a rotatable support for the smooth roller 166. The end of each plate 164 is bent outwardly and has a hole therethrough to receive a screw 168 upon which a spring 170 is mounted, bearing against pins 172 on roller 166 which project through slots in plates 164, thereby urging the roller toward knurled roller 158. The foil is trained up the front of the machine, over roller 158 and beneath roller 166, thence upwardly through slot 174 in guide 176. The guide is mounted upon a stationary part of body 50. A U-shaped guide 178 is mounted upon the extremity of rocker arm 72 at the rear thereof through which the foil is reeved as seen in FIGURE 3. The foil may then fall into a suitable receptacle or waste basket.

To rotate the knurled roller 158 a pinion 180 is mounted upon the axis thereof. A pair of opposed racks 182 and 184 mesh with the pinion on either side thereof. The racks are supported upon a bracket 186 which is fixed upon goose neck housing 88 of the machine. Bracket 186 has a pair of slots 188 and 190 each of which receives a screw 192 or 194 upon which a block 196 or 198 is secured. The racks 182 and 184 are pivotally mounted between the blocks and the brackets by suitable pins the position thereof being determined by the moving and tightening of the screws 192 and 194. The teeth on rack 182 are so directed to turn knurled roller 158 counterclockwise in FIGS. 3, 17 and 18 and thereby pull the foil across the printing bed upon upward movement of the type holder 92 while the teeth on rack 184 are oppositely inclined to drive the roller 158 counterclockwise upon the downward stroke. In this manner the roller 158 is rotating and thus drawing foil 144 across the printing bed. The pull on the foil may be varied by adjustment of screws 168 and hence the force of smooth roller 166 holding the foil against the knurled roller 158.

Means are provided for advancing the tape 128 across the printing bed. Wheel 195 is driven by means hereinafter to be described and carries at its periphery an O-ring 197 of a suitable material for frictionally engaging the tape such as rubber. An idler roller 199 is mounted upon arm 200 which is pivotally mounted about pin 202 in block 204 secured to the base of the machine. A spring 206 mounted upon block 204 urges arm 200 upwardly and hence roller 199 towards wheel 195. The tape 128 is trained between wheel 195 and roller 199 and as the wheel is driven it draws the tape through the machine.

Wheel 195 is intermittently driven by gear segment 208 meshing with pinion 210 mounted on a common axle 212 with wheel 195.

The drive for gear segment 208 is taken from shaft 20 which projects beyond cam 54 and out of body 50 and carries a second cam 214. Pivotally mounted upon cam 214 is a crank arm 216 which is at its opposite end pivotally connected to shaft 218 mounted in sleeve 220 of body 50 for vertical reciprocation in response to crank arm 216. The upper extremity of shaft 218 is forked to receive one extremity of rocking arm 221 while pin 222 provides a pivotal connection. The arm 221 is slotted as at 224 to receive pin 226 which functions as a fulcrum for the arm. At the end of arm 221 is a sleeve 228 projecting at right angles thereto. Sleeve 228 receives arm 230 which is secured therein by set screw 232. Arm 230 carries a ball 234 thereon which fits between arms 236 and 238 projecting from gear segment 208 (see FIGURE 10). Thus pivoting of rocker arm 221 is transmitted into oscillation of gear segment 208 which meshes with pinion 210. The pinion 210 is free to rotate on axle 212 and carries a pawl 240 which engages a second pinion 242 keyed to axle 212. The pawl 240 is formed to drive pinion 242 upon motion of the gear segment 208 in one direction and to slip upon motion in the other, thereby providing a one way drive.

The take-up reel 132 is rotatably mounted upon shaft 244 supported from bracket 246. The shaft carries a pulley 248 at its extremity over which is reeved an endless spring 250 which is also reeved over a pulley 252 on axle 212. Thus as wheel 195 is driven, the take-up reel is also driven to keep winding the printed-upon tape up as fast as it is fed through the machine. The spring 250 permits slipping in the take-up wheel drive to accommodate varying tension as the amount of tape on reel 132 increases.

To vary the tape drive the fulcrum for rocker arm 221 may be moved. The pin 226 which serves as a fulcrum for arm 221 is mounted between opposed sides of an H-shaped support 254 which is mounted upon bar 256 and held in place by set screw 258. A bar 260 is urged upwardly by set screw 262 to lock support 254 in the desired position on bar 256. Bar 256 is spaced from and rigidly mounted upon body 50 by screw 264 and housing 88 by screw 266.

Pivotally secured to H-shaped support 254 is a link 268 which is pivotally secured to crank 270. The crank is rotatably mounted upon shaft 272 projecting from body 50. A coil spring 274 has one extremity bearing against body 50 and the other against the remaining arm of crank 270 urging the crank to rotate clockwise in FIGURE 3. The set screw 262 may be loosened and the fulcrum 226 moved by pivoting of the crank arm which may be done manually or remotely by a treadle or other means well known to those skilled in the art to vary the rate of feeding tape through the machine.

A damper 276 is provided comprising a roller 278 on a shaft 280 spring biased by spring 282. The roller engages cam 214 to insure, when the clutch between shafts 12 and 20 is disconnected by the insertion of plunger 42 into slot 40, that the tape feeding mechanism will stop at a predetermined position to maintain the desired timing sequence.

If desired, a switch box 284 may be mounted on motor 10 which box is connected to an electrical source. One line goes from the box to the motor with a switch 286 therein and a second line to heating element 98 with switch 288 in this circuit. Thus, the switch 288 may be thrown to heat the type prior to commencing the stamping operation. A rheostat 290 may be in this heating circuit to vary the temperature and thermometer 292 on the type holder indicates the temperature.

With the foil 144 reeved from shaft 146, over the printing bed, over the foil drive roller 158, and tape 128 reeved from reel 130, over the printing bed through the tape driving mechanism to the take-up reel 132, the machine is prepared for operation. Switch 288 may be closed and rheostat 290 set to bring the type to the required temperature. Switch 286 is then closed to start the motor. Lever 48 is then pulled downwardly to engage the clutch and drive shaft 20 rotating cams 54 and 214. Cam 54 causes the ram bar 86 and the type mounted thereon to reciprocate vertically to print on tape 128. Cam 214 functions through suitable mechanism to drive the tape feed while take-up reel 132 is driven by spring 25 permitting slipping thereof to compensate for increased tension as more tape is wrapped on the take-up reel.

While what hereinbefore has been described is the preferred embodiment of this invention it is readily apparent that alterations and modifications can be resorted to without departing from the scope of this invention and such alterations and modifications are intended to be included within the scope of the appended claims.

I claim:
1. A tape marking machine comprising a printing bed, a type holding head supporting means mounted for vertical reciprocation to and from said bed, tape guiding means on said bed confining tape to be marked to a predefined path across said bed, foil guiding means on said bed confining foil to a predefined path across said bed and across the path of said tape, a driven shaft, means converting rotation of said shaft into reciprocation of said type holding head supporting means, means driven by said shaft to draw tape across said printing bed, a knurled roller mounted upon said reciprocating supporting means for reciprocation therewith, a pinion on said roller, a pair of non-reciprocating racks, one on each side of said pinion having teeth therein adapted to mesh with said pinion and rotate same in the same direction upon reciprocation of said supporting means in both directions, and means for holding foil in frictional contact with said roller.

2. A tape marking machine comprising a printing bed, a type holding head supporting means mounted for vertical reciprocation to and from said bed, tape guiding means on said bed confining tape to be marked to a predefined path across said bed, foil guiding means on said bed confining foil to a predefined path across said bed and across the path of said tape, a driven shaft, means converting rotation of said shaft into reciprocation of said type holding head supporting means, means driven by said shaft to draw tape across said printing bed, a knurled roller mounted upon said reciprocating supporting means for reciprocation therewith, a pinion on said roller, a pair of non-reciprocating racks, one on each side of said pinion having teeth therein adapted to mesh with said pinion and rotate same in the same direction upon reciprocation of said supporting means in both directions, means for holding foil in frictional contact with said roller, and means driven by said shaft to draw tape across said bed.

3. A tape marking machine comprising a printing bed, a type holding head supporting means mounted for vertical reciprocation to and from said bed, tape guiding means on said bed confining tape to be marked to a predefined path across said bed, foil guiding means on said bed confining foil to a predefined path across said bed and across the path of said tape, a driven shaft, means converting rotation of said shaft into reciprocation of said type holding head supporting means, means driven by said shaft to draw tape across said printing bed, a knurled roller mounted upon said reciprocating supporting means for reciprocation therewith, a pinion on said roller, a pair of non-reciprocable racks, one on each side of said pinion having teeth therein adapted to mesh with said pinion and rotate same in the same direction upon reciprocation of said supporting means in both directions, means for holding foil in frictional contact with said roller, and means driven by said shaft to draw tape across said bed, said last-mentioned means including means adjusting said drive for a variation in tension on said tape.

4. A tape marking machine comprising a printing bed, a type holding head supporting means mounted for vertical reciprocation to and from said bed, tape guiding means on said bed confining tape to be marked to a predefined path across said bed, foil guiding means on said bed confining foil to a predefined path across said bed and across the path of said tape, means for vertically reciprocating said type holding head, a pair of tape holding reels, one on each side of said bed, means in said bed for confining tape extending between said reels across said bed, and means driven synchronously with said reciprocating means for drawing tape across said bed, said last-mentioned means including means adjusting said drive for a variation in tension on said tape.

5. A tape marking machine comprising a printing bed, a type holding head supporting means mounted for vertical reciprocation to and from said bed, tape guiding means on said bed confining tape to be marked to a predefined path across said bed, foil guiding means on said bed confining foil to a predefined path across said bed and across the path of said tape, means for vertically reciprocating said type holding head, a pair of tape holding reels, one on each side of said bed, means in said bed for confining tape extending between said reels across said bed, a wheel, a spring biased roller clamping the tape between said roller and said wheel, means for driving said wheel intermittently in one direction to draw tape through said machine, and means driving one of said reels upon driving of said wheel.

6. A tape marking machine comprising a printing bed, a type holding head supporting means mounted for vertical reciprocation to and from said bed, tape guiding means on said bed confining tape to be marked to a predefined path across said bed, foil guiding means on said bed confining foil to a predefined path across said bed and across the path of said tape, a driven shaft, means converting rotation of said shaft into reciprocation of said type holding head supporting means, means driven by said shaft to draw tape across said printing bed, a knurled roller mounted upon said reciprocating supporting means for reciprocation therewith, a pinion on said roller, a pair of non-reciprocable racks, one on each side of said pinion having teeth therein adapted to mesh with said pinion and rotate same in the same direction upon reciprocation of said supporting means in both directions, means for holding foil in frictional contact with said roller, a pair of tape holding reels on either side of said bed, means in said bed for confining tape extending between said reels across said bed, a wheel, a spring biased roller clamping the tape between said roller and said wheel, means for driving said wheel intermittently in one direction to draw tape through said machine, and means driving one of said reels upon driving of said wheel.

References Cited in the file of this patent

UNITED STATES PATENTS

| | | |
|---|---|---|
| 739,538 | Fredson | Sept. 22, 1903 |
| 1,295,782 | Masten | Feb. 25, 1919 |
| 1,933,833 | Westlund et al. | Nov. 7, 1933 |
| 2,053,473 | Gould et al. | Sept. 8, 1936 |
| 2,248,419 | Auld | July 8, 1941 |
| 2,505,900 | Knitter | May 2, 1950 |
| 2,517,493 | Kingsley | Aug. 1, 1950 |
| 2,547,602 | Schmitt | Apr. 3, 1951 |